(12) United States Patent
Rajagopal et al.

(10) Patent No.: US 8,731,406 B2
(45) Date of Patent: May 20, 2014

(54) APPARATUS AND METHOD FOR GENERATING HIGH RESOLUTION FRAMES FOR DIMMING AND VISIBILITY SUPPORT IN VISIBLE LIGHT COMMUNICATION

(75) Inventors: Sridhar Rajagopal, Plano, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 498 days.

(21) Appl. No.: 12/767,678

(22) Filed: Apr. 26, 2010

(65) Prior Publication Data

US 2011/0064416 A1 Mar. 17, 2011

Related U.S. Application Data

(60) Provisional application No. 61/276,783, filed on Sep. 16, 2009.

(51) Int. Cl.
*H04B 10/00* (2013.01)
*G09G 5/10* (2006.01)

(52) U.S. Cl.
USPC ............ 398/130; 398/118; 398/120; 345/691

(58) Field of Classification Search
USPC ................................................. 398/118, 130
See application file for complete search history.

(56) References Cited

U.S. PATENT DOCUMENTS

| | | | |
|---|---|---|---|
| 7,742,704 B2 | 6/2010 | Suzuki et al. | |
| 2006/0170370 A1 | 8/2006 | De Anna | |
| 2006/0239689 A1 | 10/2006 | Ashdown | |
| 2007/0092264 A1 | 4/2007 | Suzuki et al. | |
| 2007/0109328 A1* | 5/2007 | Lewis | 345/691 |
| 2009/0214225 A1 | 8/2009 | Nakagawa et al. | |
| 2009/0232502 A1* | 9/2009 | Miyashita | 398/79 |
| 2010/0135669 A1 | 6/2010 | Kim et al. | |

FOREIGN PATENT DOCUMENTS

| | | |
|---|---|---|
| JP | 2006-325085 | 11/2006 |
| JP | 2007-097071 | 4/2007 |
| JP | 2008-206087 | 9/2008 |
| JP | 2009-117892 | 5/2009 |
| WO | WO 2008/025153 A1 | 3/2008 |

OTHER PUBLICATIONS

ECMA/TC47/2009/011 "Lumilink White Paper".*
Sugiyama ["Brightness Control Methods for Illumination and Visible Light Communication". ICWMC 2007].*
International Search Report dated Mar. 24, 2011 in connection with International Patent Application No. PCT/KR2010/006323.
"LumiLink, White Paper", ecma, Nov. 2009, 8 pages.
Japanese Examination Report dated May 14, 2013 in connection with Japanese Patent Application No. 2012-529674, 5 pages.

* cited by examiner

*Primary Examiner* — Oommen Jacob

(57) ABSTRACT

For use in a visible light communication (VLC) network, a method for generating high resolution visibility frames for visibility or dimming support. The method includes determining a required visibility for the high resolution frames. The method also includes generating a pattern that meets the determined required visibility, the pattern having a first quantity of first low resolution frames and a second quantity of second low resolution frames. The method further includes transmitting the pattern to achieve the required high resolution frames.

20 Claims, 9 Drawing Sheets

APPARATUS AND METHOD FOR GENERATING HIGH RESOLUTION FRAMES FOR DIMMING AND VISIBILITY SUPPORT IN VISIBLE LIGHT COMMUNICATION

CROSS-REFERENCE TO RELATED APPLICATION(S) AND CLAIM OF PRIORITY

The present application is related to U.S. Provisional Patent Application No. 61/276,783, filed Sep. 16, 2009, entitled "GENERATING HIGH RESOLUTION VISIBILITY FRAMES FROM VISIBLE LIGHT COMMUNICATION". Provisional Patent Application No. 61/276,783 is assigned to the assignee of the present application and is hereby incorporated by reference into the present application as if fully set forth herein. The present application hereby claims priority under 35 U.S.C. §119(e) to U.S. Provisional Patent Application No. 61/276,783.

TECHNICAL FIELD OF THE INVENTION

The present application relates generally to visible light communication and, more specifically, to methods for generating high resolution visibility frames for visible light communication.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

FIG. 1 depicts the full electromagnetic frequency spectrum, and a breakout of the wavelengths occupied by visible light. The visible light spectrum extends from approximately 380 to 780 nm in wavelength, which corresponds to a frequency range of approximately 400 to 790 THz. Since this spectrum is large and can support light sources with multiple colors, VLC technology can provide a large number of channels for communication.

SUMMARY OF THE INVENTION

For use in a visible light communication (VLC) network, a method for generating high resolution frames for dimming support is provided. The method includes determining a required visibility for the high resolution frames. The method also includes generating a pattern that meets the determined required visibility, the pattern having a first quantity of first low resolution frames and a second quantity of second low resolution frames. The method further includes transmitting the pattern to achieve the required high resolution frames.

For use in a visible light communication (VLC) network, a transmitter capable of generating and transmitting high resolution frames for dimming support is provided. The transmitter includes a controller and a light source. The controller is configured to determine a required visibility for the high resolution visibility frames, and generate a pattern that meets the determined required visibility, the pattern having a first quantity of first low resolution frames and a second quantity of second low resolution frames. The light source is configured to transmit the pattern to achieve the required high resolution frames.

For use in visible light communication (VLC), a system for generating high resolution frames for dimming support is provided. The system includes a receiver and a transmitter. The transmitter is configured to determine a required visibility for the high resolution frames. The transmitter is also configured to generate a pattern that meets the determined required visibility, the pattern comprising a first quantity of first low resolution frames and a second quantity of second low resolution frames. The transmitter is further configured to transmit the pattern to achieve the required high resolution frames. The receiver is configured to receive data at the required visibility by adapting the data reception according to the pattern generated at the transmitter.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

The following documents and standards descriptions are hereby incorporated into the present disclosure as if fully set forth herein:

Visibility for VLC on TRD: IEEE 802.15-09-0372-01-0007;

W. C. Kim et al., "Efficient resource allocation scheme for visible-light communication", Proc. Of SPIE, Vol. 7234. pp. 72340M-72340M-9, 2009;

IEEE 802.15.7, which may be accessed at the time of filing at the document archives of the IEEE 802.15.7 Visible Light Communication Task Group in the website of IEEE 802;

TG7 Technical Considerations Document: IEEE 802.15-09-0564-01-0007;

ECMA TC-47, which may be accessed at the time of filing at the document archives of the TC 47 Near Field Communication in the website of Ecma international; and Dimming considerations for visible light communication: IEEE 802.15-09-0369-00-0007.

Figure 1:
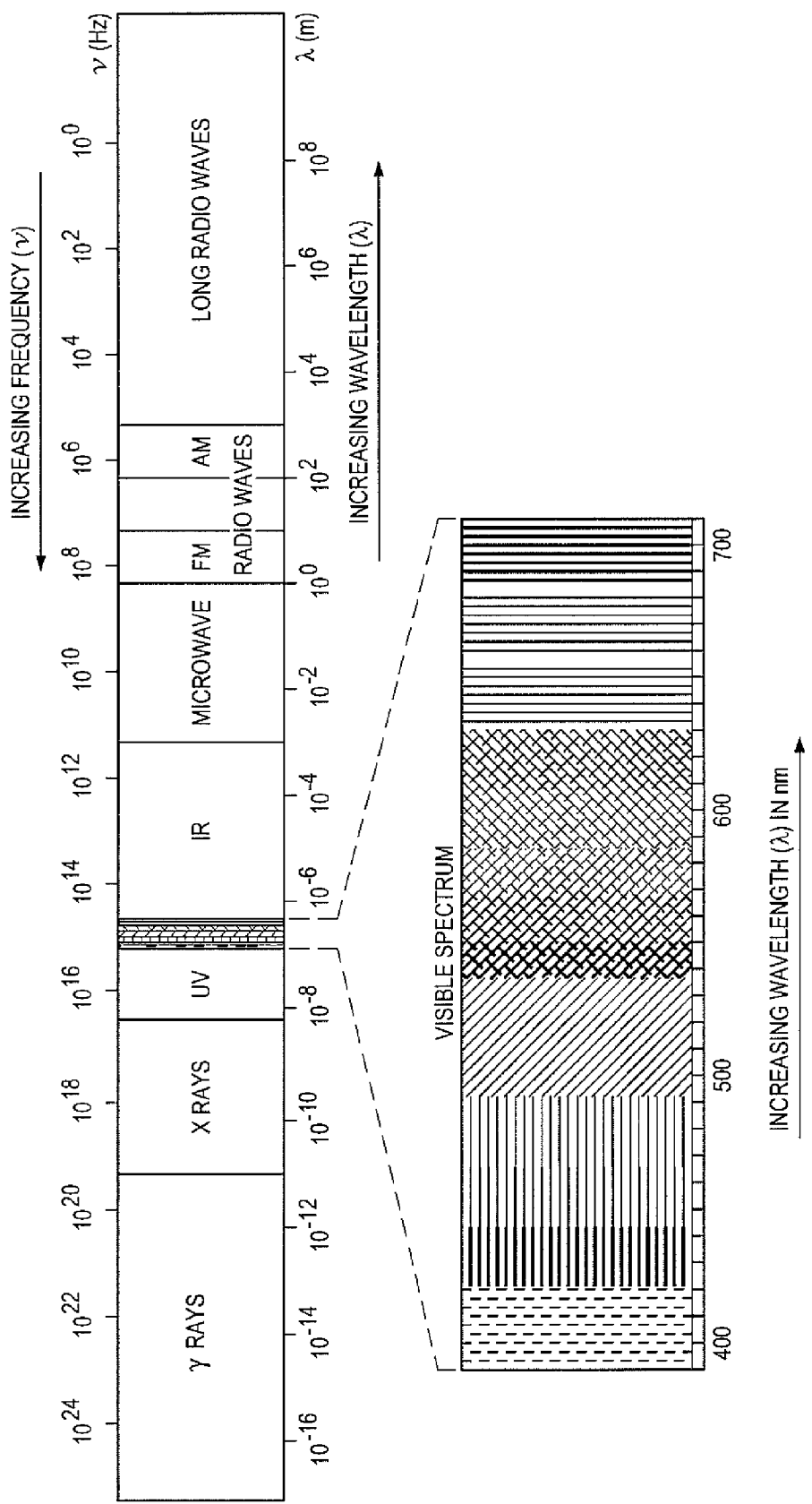
FIG. 1 depicts the full electromagnetic frequency spectrum, and a breakout of the wavelengths occupied by visible light.
Figure 2:
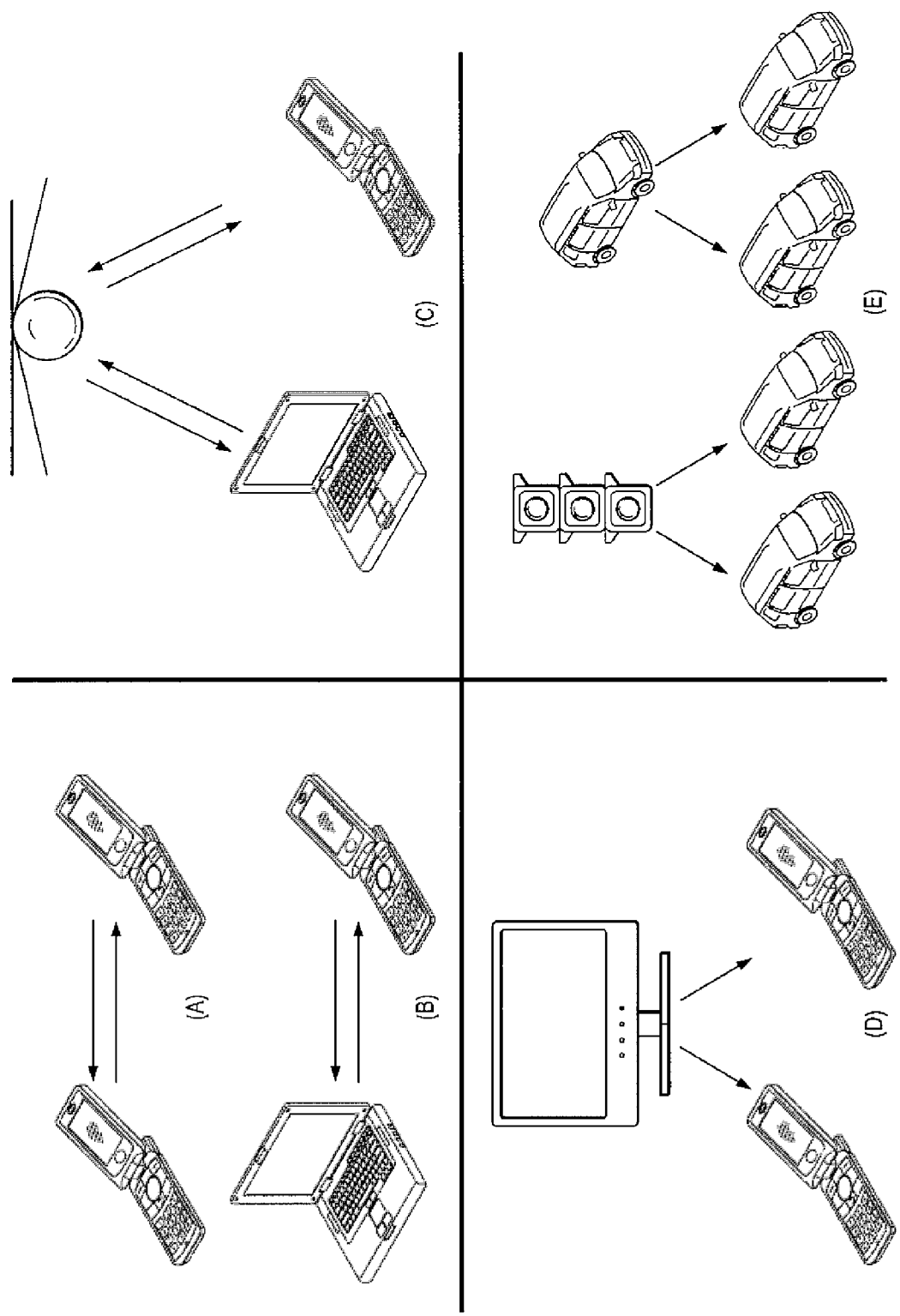
FIG. 2 depicts several exemplary applications that can be enabled by visible light communication.

VLC enables a wide range of applications with diverse requirements. FIG. 2 depicts several exemplary applications that can be enabled by VLC. FIG. 2(a) shows an example of peer-to-peer (P2P) communication. In this example, a mobile phone communicates with another mobile phone using VLC. FIG. 2(b) shows an example of another type of P2P VLC communication known as near field communication (NFC). NFC may be used where the communication distance is very short (<30 cm or so). In NFC, very high data rates (>100 Mbps) can be attained. In the example shown, a mobile phone communicates with a laptop computer using VLC.

FIG. 2(c) shows an example of a visible LAN (VLAN) system where the infrastructure lighting system also functions as an access point and enables LAN service to one or more devices, such as a laptop or a mobile phone. FIG. 2(d) shows an example of an information broadcasting (IB) system where a display at a public location (e.g., a mall or museum) could broadcast information (e.g., information about facilities, directions, or services) using VLC. Devices (e.g., mobile phones) that are in range of the broadcast may then receive the information. FIG. 2(e) shows an example of the use of VLC for vehicular broadcasting (VB) applications such as conveying safety or traffic information from traffic signals or from other cars. It will be understood that the VLC applications and devices shown in FIG. 2 are for example purposes only. Other VLC applications and devices are possible.

One requirement for many VLC applications is that an infrastructure light source (e.g., overhead ambient light) may need to be maintained in an "ON" state to avoid loss of transmission (TX) output and to avoid flicker during downlink transmissions. Continuous "ON" is also important for VLAN uplink and P2P applications that support point-and-shoot techniques to focus the light on the receiver for optimal communication (i.e., pointing). One method for ensuring a continuous "ON" state is shown in FIG. 3.

Figure 3:
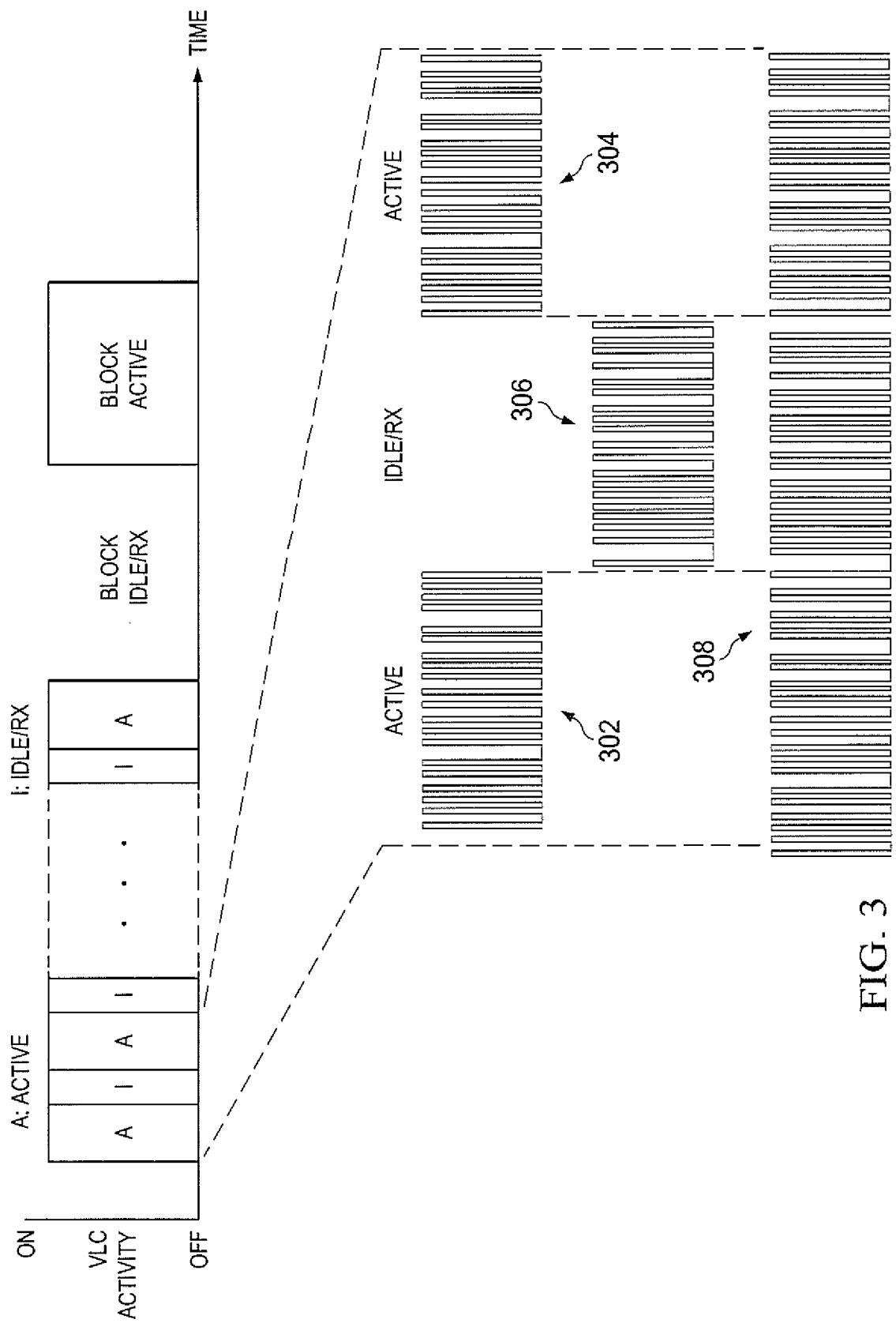
FIG. 3 depicts an idle/receiving (idle/RX) state signal that is transmitted during idle or receiving states of an infrastructure light source, according to one embodiment of the present disclosure.

FIG. 3 depicts an idle/receiving (idle/RX) state signal that is transmitted during idle or receiving states of an infrastructure light source, according to one embodiment of the present disclosure. If a light source transmits at certain intervals, and is then idle between those intervals, visible flicker in the light source can result. An idle/receiving state signal can be used to maintain optimal visibility and flicker-free operation during idle or receiving periods at the infrastructure. This is accomplished by the idle/receiving signal mimicking the general pattern of the active transmission signal. Specifically, the idle/receiving signal has generally the same duty cycle that is used during the active signal.

Looking at FIG. 3, it is seen that a light source transmits signals 302 and 304 during two active transmission blocks. The active transmission blocks are separated by an idle/receiving block. To reduce flickering, an idle/RX state signal 306 is generated to be transmitted during the idle/receiving block. When the idle/RX state signal 306 is transmitted during the idle/receiving block, the result is a substantially regular output signal 308 by the light source. Accordingly, the flicker or visibility effects that would be seen during idle periods are reduced or eliminated. In one embodiment, regular output signal 308 may be an infrastructure transmission output. In another embodiment, regular output signal 308 may be a point-and-shoot transmission output, as explained in greater detail below. Transmission of data signals during idle/RX periods in order to control visible flicker is unique to VLC. The ability to control flicker in this manner is often called visibility support.

Figure 4:
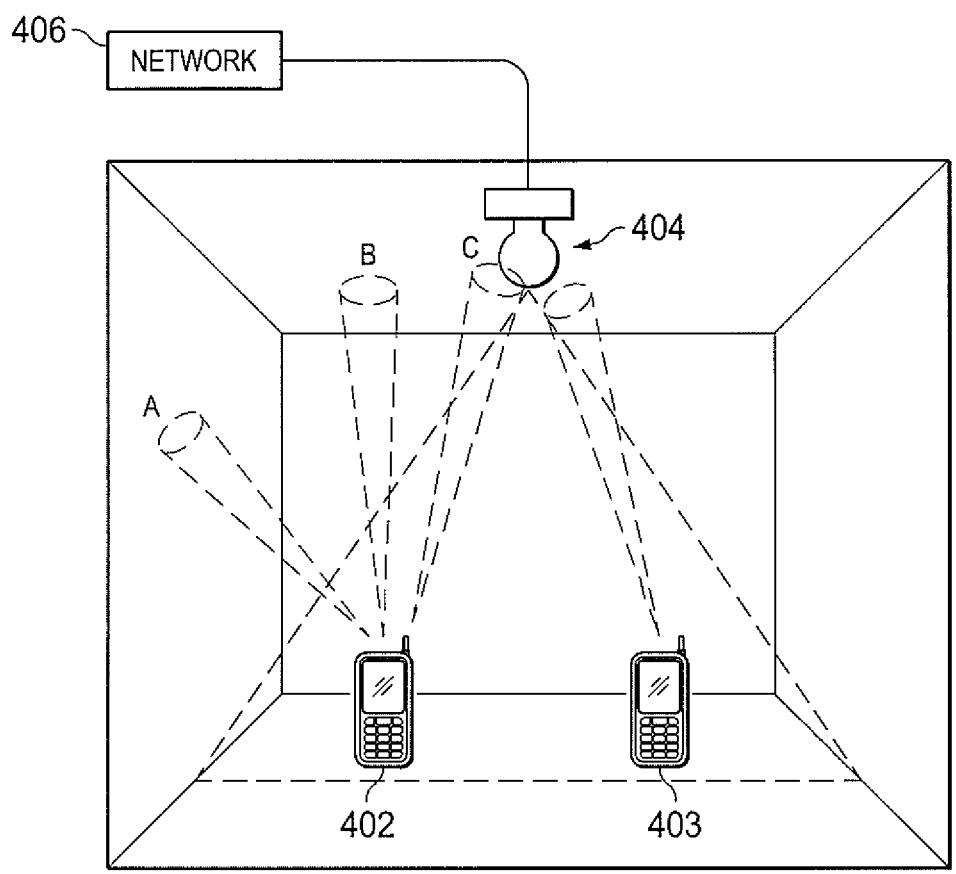
FIG. 4 shows a detailed example of the need for visibility for point-and-shoot applications.

FIG. 4 shows a more detailed example of the need for visibility for point-and-shoot applications. In FIG. 4, mobile devices 402 and 403 wish to communicate via VLC with access point 404, which serves as an access point for network 406. In order to improve performance, mobile device 402 needs to point accurately to access point 404. As shown in FIG. 4, mobile device 402 needs adjustment of its beam until it points directly to access point 404. With the beam in position A, there is no communication possible. As the user moves the beam of mobile device 402 towards access point 404, the beam reaches position B. At position B, mobile device 402 may be sufficiently aligned with access point 404 such that downlink communication is possible. However, uplink communication is still not possible. In position C, mobile device 402 is substantially aligned with access point 404, enabling both uplink and downlink transmissions. However, if there are significant idle periods in the transmission, the signal strength of the beam from mobile device 402 will be very weak. Thus, a visibility pattern could be sent from mobile device 402 to assist with pointing.

Figure 5:
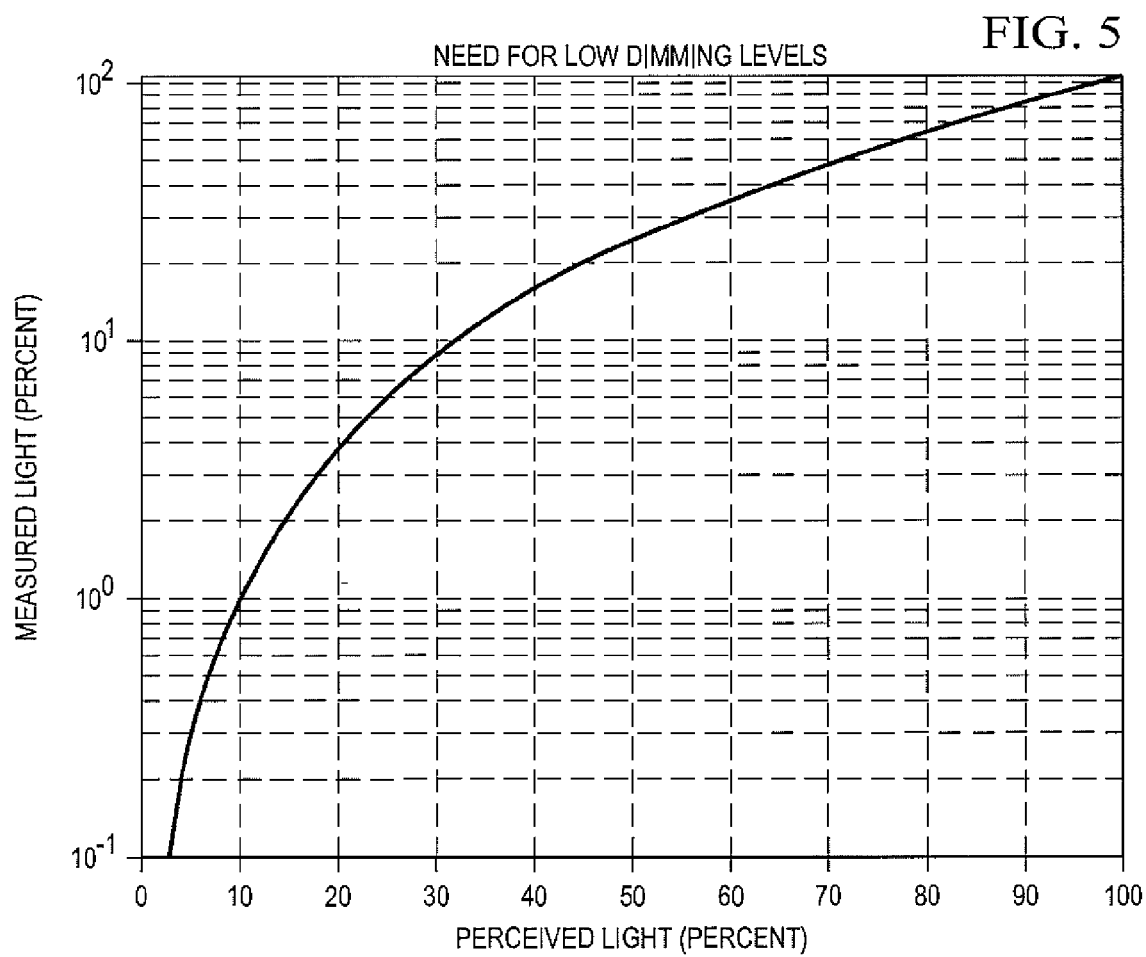
FIG. 5 shows a graph depicting the human eye's perception of light of increasing brightness.

In many cases, it may be desirable to achieve high resolution visibility patterns for support in dimming applications. FIG. 5 shows a graph depicting the human eye's perception of light of increasing brightness. As seen in the graph, the human eye has a non-linear response to the dimming level. At low light levels, the amount of light that a human eye perceives is greater than the actual light present in the room, based on a light measurement from a lux meter. Thus, particularly at low light levels, it is desirable to have a wide range of visibility levels that can be supported by a light source. In preferred embodiments, the dimming range of the light source may vary between 0.1-100% in order to have the visibility setting appropriate to the user's comfort.

It is also important that visibility patterns and data patterns be matched well to minimize flicker at the infrastructure. Thus, if a data transmission pattern is adjusted for dimming, any associated visibility pattern(s) should also be adjusted.

The prior art has only considered a limited number of visibility patterns. This is because support for applications that support dimming did not consider visibility; thus, there previously has been no consideration of high resolution patterns. For example, ECMA TC-47 describes only eleven (11) different patterns for visibility. These patterns are shown in Table 1 below. As seen in the table, the visibility patterns range from 0% to 100% in increments or steps of 10%. These visibility patterns could therefore be considered low resolution patterns. ECMA TC-47 does not provide any visibility patterns at finer resolution levels, e.g., 1% or 0.1% resolution. Thus, ECMA TC-47 offers no suggestion for achieving an overall visibility of, e.g., 43% or 25.8%. Furthermore, defining distinct visibility patterns at finer resolution levels would quickly become impractical. For example, it would require at least one thousand different visibility patterns to support a full range of 0.1% resolution levels for dimming.

TABLE 1

Currently Proposed Visibility Patterns In ECMA TC-47

| Visibility Pattern | Percentage of Visibility |
|---|---|
| 11111 11111 | 100% |
| 11110 11111 | 90% |
| 11110 11110 | 80% |
| 11101 11100 | 70% |
| 11001 11100 | 60% |
| 10001 11100 | 50% |
| 00001 11100 | 40% |
| 00001 11000 | 30% |
| 00001 10000 | 20% |
| 00001 00000 | 10% |
| 00000 00000 | 0% |

Another example of VLC communication that fails to provide support for high resolution dimming is Variable Pulse Position Modulation (VPM). VPM is a modulation scheme that employs the characteristics of Pulse Position Modulation (2-PPM) and Pulse Width Modulation (PWM). VPM makes use of the concepts of 2-PPM for non-flicker and PWM for dimming control function and full brightness. Dimming control function and full brightness in VPM is achieved by controlling the pulse width of a VPM signal, which means the "ON" time width of a light source.

Figure 6:
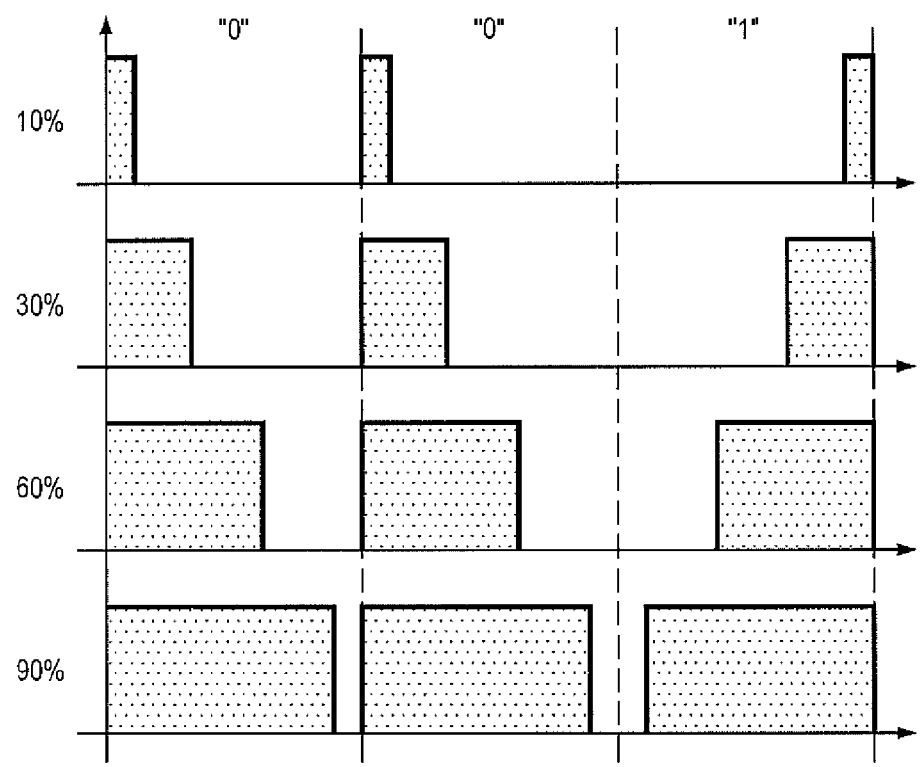
FIG. 6 depicts dimming support in Variable Pulse Position Modulation (VPM) by controlling the pulse width of the VPM signal.

FIG. 6 depicts dimming support in VPM by controlling the pulse width of the VPM signal. Bits "0" and "1" are distinguished by the pulse position in each period. The pulse width determines the dimming level. FIG. 6 depicts example dimming levels with a resolution of 10%. However, VPM cannot provide high resolution dimming because it would require the device to support an extremely high clock rate in order to obtain a fine resolution. For example, in order to get a 0.1% duty cycle resolution, the optical source would need to support a 1000× faster clock, which is not practical.

Embodiments of the present disclosure provide methods of generating high resolution visibility patterns for VLC. The high resolution is provided without substantial complexity and without predefining and storing hundreds or thousands of different visibility patterns in memory. The disclosed methods may be used for supporting point-and-shoot, continuous infrastructure illumination, dimming, and other VLC communication. The disclosed methods are also compatible with VPM communication.

In order to generate the high resolution patterns, there are certain factors that should be considered:

The number of transitions between 0's and 1's may be maximized to provide high frequency switching in order to avoid flicker and to help the Clock and Data Recovery (CDR) circuit at the receiver for synchronization purposes, if used.

Current low resolution visibility patterns may have certain properties (e.g., a visibility pattern may not match any existing data pattern out of the 8b10b code). These properties may be preserved with new high resolution patterns.

Defining one thousand or more patterns to support fine resolutions (e.g., 0.1% resolution) would not be practical and would make visibility pattern generation and use very complex.

Visibility patterns should be transmitted in order to minimize flicker and meet regulatory requirements in the presence or absence of dimming. If visibility patterns are transmitted with changing the clock frequency (in-band), the patterns that are used should avoid conflicts with existing RLL codewords.

Figure 7:
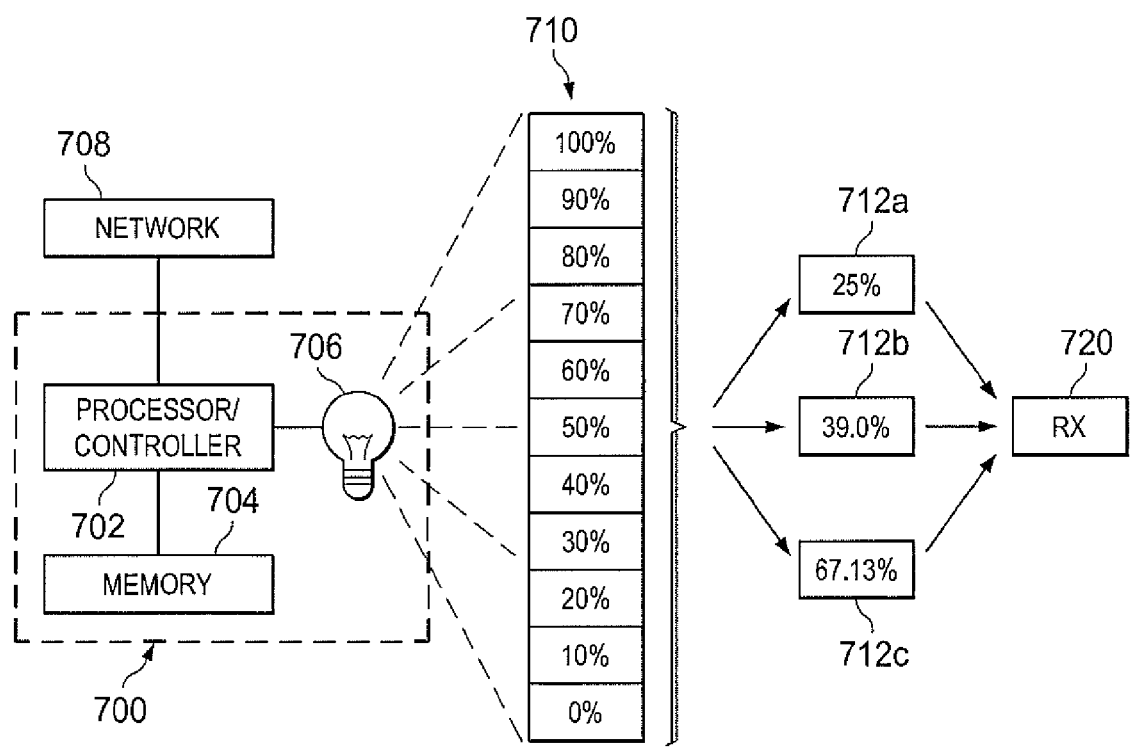
FIG. 7 depicts a transmitter configured to combine existing low resolution visibility patterns to create high resolution dimming patterns, according to embodiments of the present disclosure.

In embodiments of the present disclosure, existing low resolution patterns may be used to develop high resolution dimming patterns to any precision by combining them in multiple ways and in different ratios. FIG. 7 depicts a transmitter configured to combine existing low resolution visibility patterns to create high resolution dimming patterns, according to embodiments of the present disclosure. Transmitter 700 includes a processor/controller 702, memory 704, and light source 706. Transmitter 700 is coupled to network 708. Transmitter 700 transmits to receiver 720.

Transmitter 700, through light source 706, is configured to transmit visibility patterns that are defined at 10% resolution, as indicated by reference numeral 710. In some embodiments, the defined visibility patterns 710 may correspond to the visibility patterns proposed in ECMA TC-47, as shown in Table 1 above. In order to create a 25% dimming pattern, indicated by reference numeral 712a, light source 706 would alternately send a 20% visibility pattern followed by a 30% visibility pattern. This method guarantees all frames will retain the same properties as existing visibility frames. Because there are multiple ways in which this can be achieved, it is desirable to choose the way that maximizes the transitions and minimizes flicker. Other dimming patterns are possible by combining different defined visibility patterns 710 in different ways. For example, it is possible to create a 39.0% dimming pattern (indicated by reference numeral 712b) and a 67.13% dimming pattern (indicated by reference numeral 712c). These are representative examples, but should not be considered limiting. In fact, any high resolution dimming pattern is possible using embodiments of the present disclosure.

The information about the required visibility level at transmitter 700 is also sent to receiver 720 before the pattern is applied at transmitter 700 for dimming support. This information may be sent, for example, via a command in the medium access control layer (MAC). Receiver 720 uses this information to know the transmitter pattern generated for dimming support. When transmitter 700 applies this pattern for data communication, receiver 720 also adapts the data reception according to the generated transmitter pattern for successful data communication.

As noted earlier, these methods for achieving high resolution visibility and dimming patterns are compatible with VPM communication. However, unlike other VLC communication, which generates high resolution frames in the medium access control layer (MAC), VPM communication generates high resolution frames in the physical layer (PHY). High resolution frames in a PHY are generated within a packet at a fine time scale. In contrast, high resolution frames in a MAC are generated across one or more packets at a coarse time scale. The VPM PHY may have basic dimming level support at a 10% duty cycle resolution, such as seen in FIG. 6. To support higher resolution for dimming, the VPM PHY may use the same algorithms as described herein. For example, in order to achieve 25% dimming, the VPM PHY may alternately send 20% and 30% duty cycle symbols.

Figure 8:
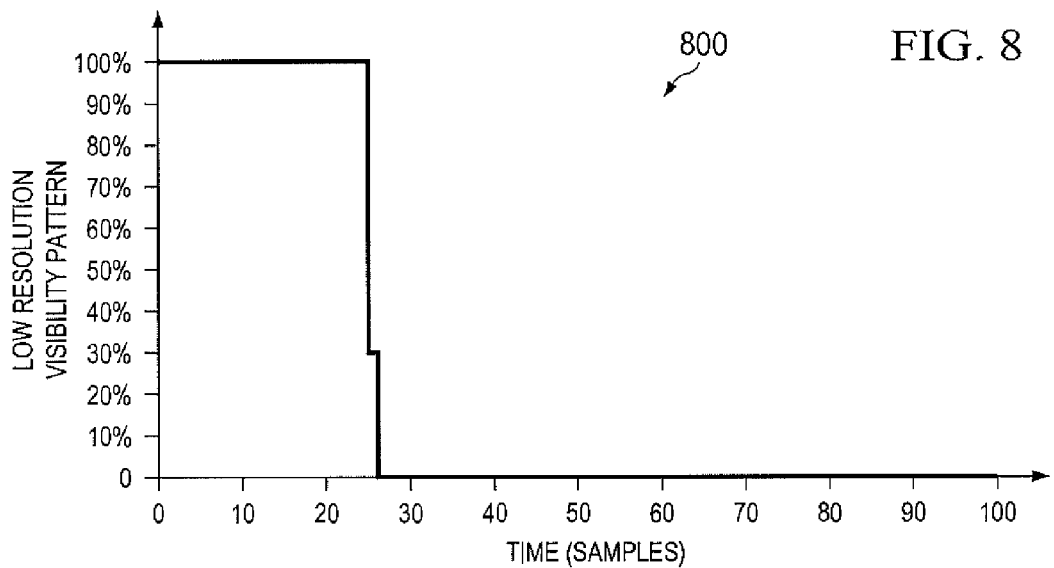
FIG. 8 depicts a graphical representation of an algorithm used to attain a high-resolution dimming capability, according to one embodiment of the present disclosure.

FIG. 8 depicts a graphical representation of an algorithm used to attain a high-resolution dimming capability, according to one embodiment of the present disclosure. The depicted algorithm 800 may be stored in a memory of a VLC transmitter, such as memory 704 in transmitter 700. Algorithm 800 will now be described using an example. In this example, it is assumed that the dimming requirement is 25.3%. Let there be predefined low resolution visibility or dimming patterns at a resolution of 10%, such as the visibility patterns detailed in Table 1. In such a case, algorithm 800 is used to attain a dimming requirement of 25.3% as follows:
  repeat 100% pattern ("11111 11111") 25 times;
  repeat 30% pattern ("00001 11000") 1 time; and
  repeat 0% pattern ("00000 00000") 74 times.

The total number of ones transmitted can be calculated as:

$N_{ones} = 25*10 + 1*3 + 74*0 = 253.$

The total number of ones and zeroes transmitted can be calculated as:

$N = 25*10 + 1*10 + 74*10 = 1000.$

Thus, the attained visibility is determined by:

$dv = N_{ones}/N = 253/1000 = 25.3\%.$

Algorithm 800 can be presented in a generalized form as follows. Let the following values be defined:
  Visibility patterns: $V_0, V_1, \ldots, V_K$ ($V_0=0\%$, $V_K=100\%$)
  Desired visibility=dv (expressed as a percentage value (e.g., for a 25.3% visibility, dv=25.3))
  Desired precision=p, p≤0, p∈Z (expressed as an integer logarithm value (e.g., for 0.01% precision, p=−2))
Thus, algorithm 800 can be represented as:

$$rep1pat = \left\lfloor \frac{dv * 10^{-p}}{K} \right\rfloor$$

$$n = dv * 10^{-p} - K * rep1pat$$

$$rep0pat = \frac{10^{2-p}}{K} - rep1pat - 1$$

Then, to achieve visibility dv:
  repeat $V_K$ pattern rep1pat times,
  repeat $V_n$ pattern 1 time, and
  repeat $V_0$ pattern rep0pat times.

A characteristic of algorithm 800 is that it groups all the 1's (100% pattern) and 0's (0% pattern) together. This can be seen in the graph in FIG. 8. Transmission of such long sequences of 1's and 0's may result in noticeable flicker at the light source, and may make synchronization with the CDR circuit more difficult. Thus, it may be desirable to interleave the 0's and 1's within the entire visibility pattern in order to minimize flicker and to help with CDR synchronization. For example, an interleaver could be used to alternate the 100% and 0% visibility patterns in the total effective visibility pattern. However, since the number of 0% patterns and 100% patterns may not be close to equal, this simple algorithm may still result in a large remaining grouping of 1's or 0's at the end of the interleaved pattern.

Figure 9:
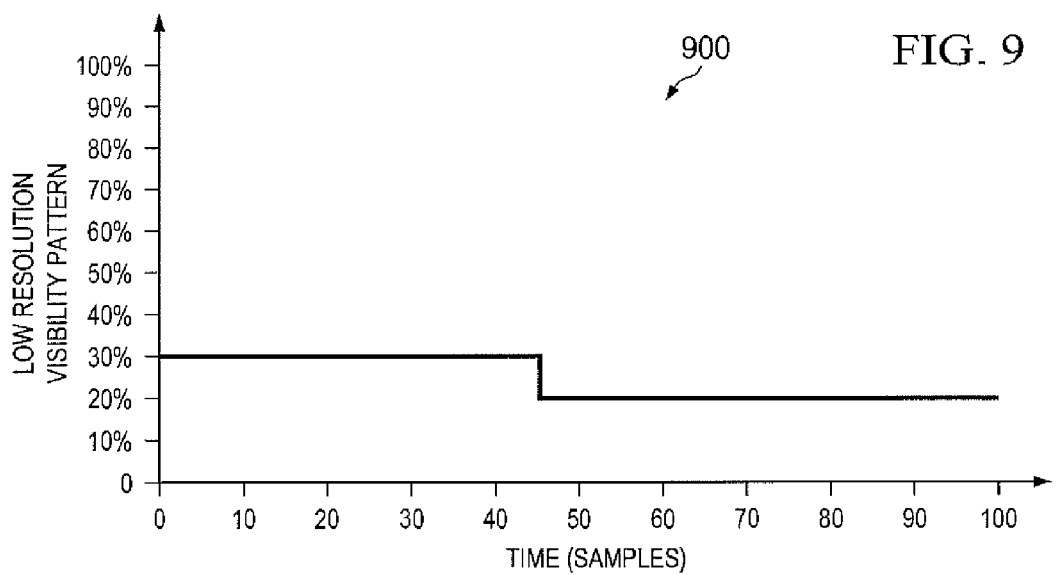
FIG. 9 depicts a graphical representation of a second algorithm used to attain a high-resolution dimming capability, according to one embodiment of the present disclosure.

FIG. 9 depicts a graphical representation of a second algorithm used to attain a high-resolution dimming capability, according to one embodiment of the present disclosure. Depicted algorithm 900 selects low resolution patterns that are closest to the desired high resolution dimming pattern. Algorithm 900 will now be described using an example. In this example, it is once again assumed that the dimming requirement is 25.3%. Let there be predefined low resolution dimming patterns at a resolution of 10%%, such as the visibility patterns detailed in Table 1. In this embodiment, algorithm 900 selects 20% and 30% visibility patterns (which are the patterns closest to the required 25.3% dimming) in order to get the desired visibility. This can be done as follows:
  repeat 20% pattern ("00001 10000") 47 times; and
  repeat 30% pattern ("00001 11000") 53 times.

The total number of ones transmitted can be calculated as:

$N_{oses} = 2*47 + 3*53 = 253.$

The total number of ones and zeroes transmitted can be calculated as:

$N = 10*47 + 10*53 = 1000.$

Thus, the attained visibility is determined by:

$dv = N_{ones}/N = 253/1000 = 25.3\%.$

Algorithm 900 can be presented in a generalized form as follows. Let the following values be defined:
  Visibility patterns: $V_0, V_1, \ldots, V_K$ ($V_0=0\%$, $V_K=100\%$)
  Desired visibility=dv (expressed as a percentage value (e.g., for a 25.3% visibility, dv=25.3))
  Desired precision=p, p≤0, p∈Z (expressed as an integer logarithm value (e.g., for 0.01% precision, p=−2))
Thus, algorithm 900 can be represented as:

$$sel1pat = \left\lfloor \frac{dv * K}{100} \right\rfloor$$

$$sel2pat = \left\lceil \frac{dv * K}{100} \right\rceil$$

$$reppat2 = 10^{-p}\left(dv - \frac{100 * sel1pat}{K}\right)$$

$$reppat1 = 10^{1-p} - reppat2$$

Then, to achieve visibility dv:
  repeat $V_{sel1pat}$ reppat1 times, and
  repeat $V_{sel2pat}$ reppat2 times.

It can be shown that algorithm 900 automatically switches to a predefined low resolution visibility pattern when the desired dimming pattern equals one of the low resolution visibility patterns. For example, if the desired visibility=20% (dv=20, p=0, K=10), then sel1pat=2, sel2pat=2;
rep2pat=0, rep1pat=100;
repeat $V_2$ 0 times out of 100; and
repeat $V_2$ 100 times out of 100.

Thus, algorithm 900 automatically selects only $V_2$ to provide 20% visibility. Algorithm 800 does not attain this desired property.

To reduce flickering and maximize transitions between 1's and 0's, interleaving is also compatible with algorithm 900. For example, to get 25.3% visibility, instead of transmitting the $V_2$ pattern 47 times and the $V_3$ pattern 53 times, an interleaver might be used so that $V_2$ and $V_3$ patterns are transmitted alternately 47 times each, and then the $V_3$ pattern is transmitted 6 times. However, since algorithm 900 automatically chooses two visibility patterns that are close together, interleaving may not be required.

An interleaving algorithm according to embodiments of the present disclosure can be described as follows:

Let 'minRep' be the minimum repetition pattern. Let remPat be the remaining repetitions after alternating sel1Pat and sel2 Pat patterns. Let selMaxPat be the pattern that has the higher number of repetitions.

Algorithm:
minRep=min(rep1pat, rep2pat);
remPat=max(rep1pat, rep2pat)−minRep;
selMaxPat=(rep1pat>rep2pat) rep1pat: rep2pat;
alternate $V_{sel1pat}$ and $V_{sel2pat}$ minRep times; and
send $V_{selmaxPat}$ remPat times.

This interleaving algorithm illustrates only one method of interleaving. It will be understood that other interleaving methods may be used with high resolution algorithms 800 and 900. The following figures illustrate a comparison of algorithms 800 and 900, with and without interleaving.

Figure 10:
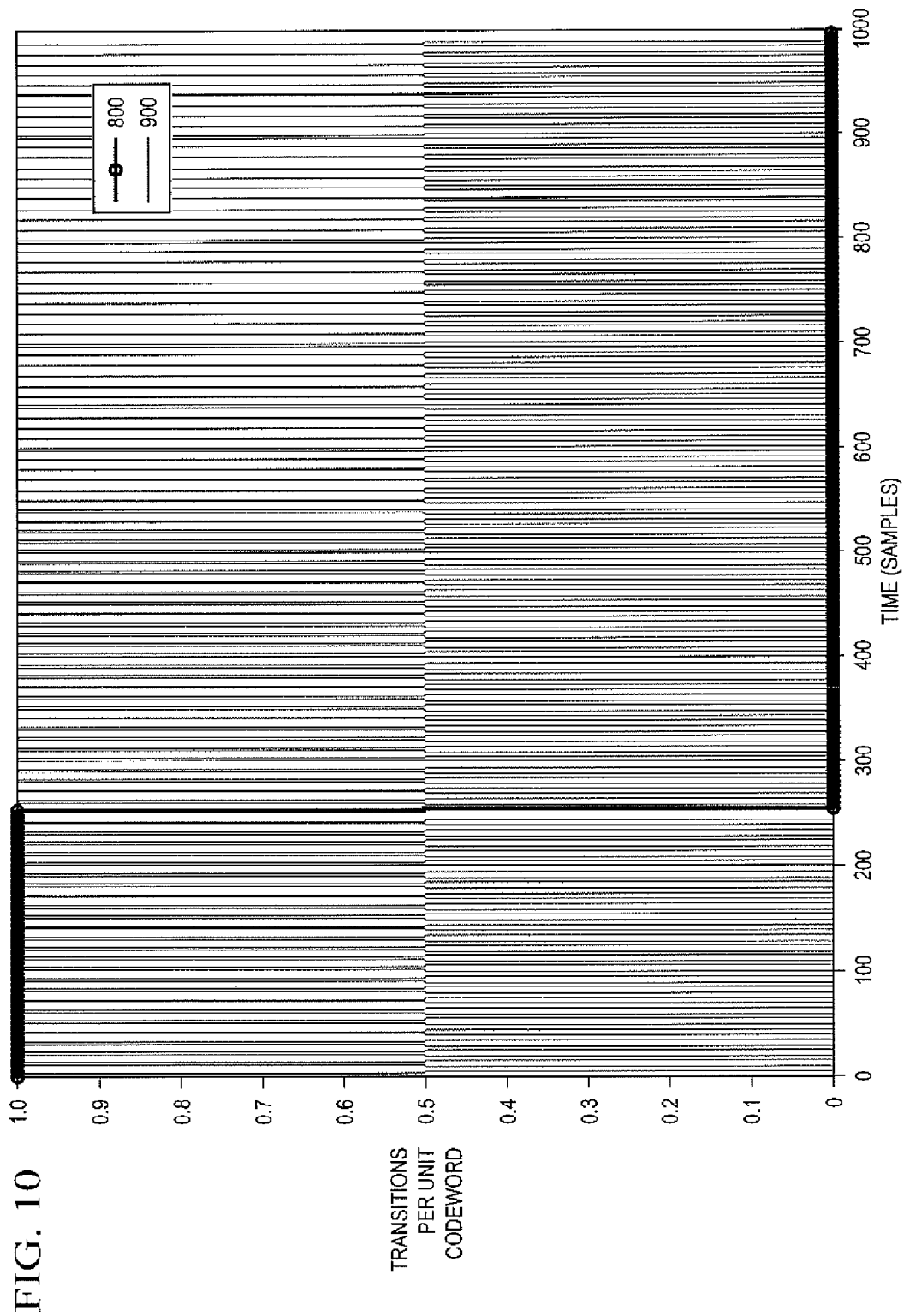
FIG. 10 shows a comparison of the two algorithms, according to embodiments of the present disclosure.

FIG. 10 shows a comparison of overall transitions in a 25.3% dimming pattern generated using algorithm 800 versus using algorithm 900, according to embodiments of the present disclosure. As can be seen in FIG. 10, algorithm 800 (represented by the heavy line) groups the 100% and 0% visibility patterns, thereby resulting in a lower frequency transition. In contrast, algorithm 900 (represented by the thin line) results in a higher frequency transition, thereby providing reduced flicker and better chance for synchronization at the receiver for the CDR, if used.

Figure 11:
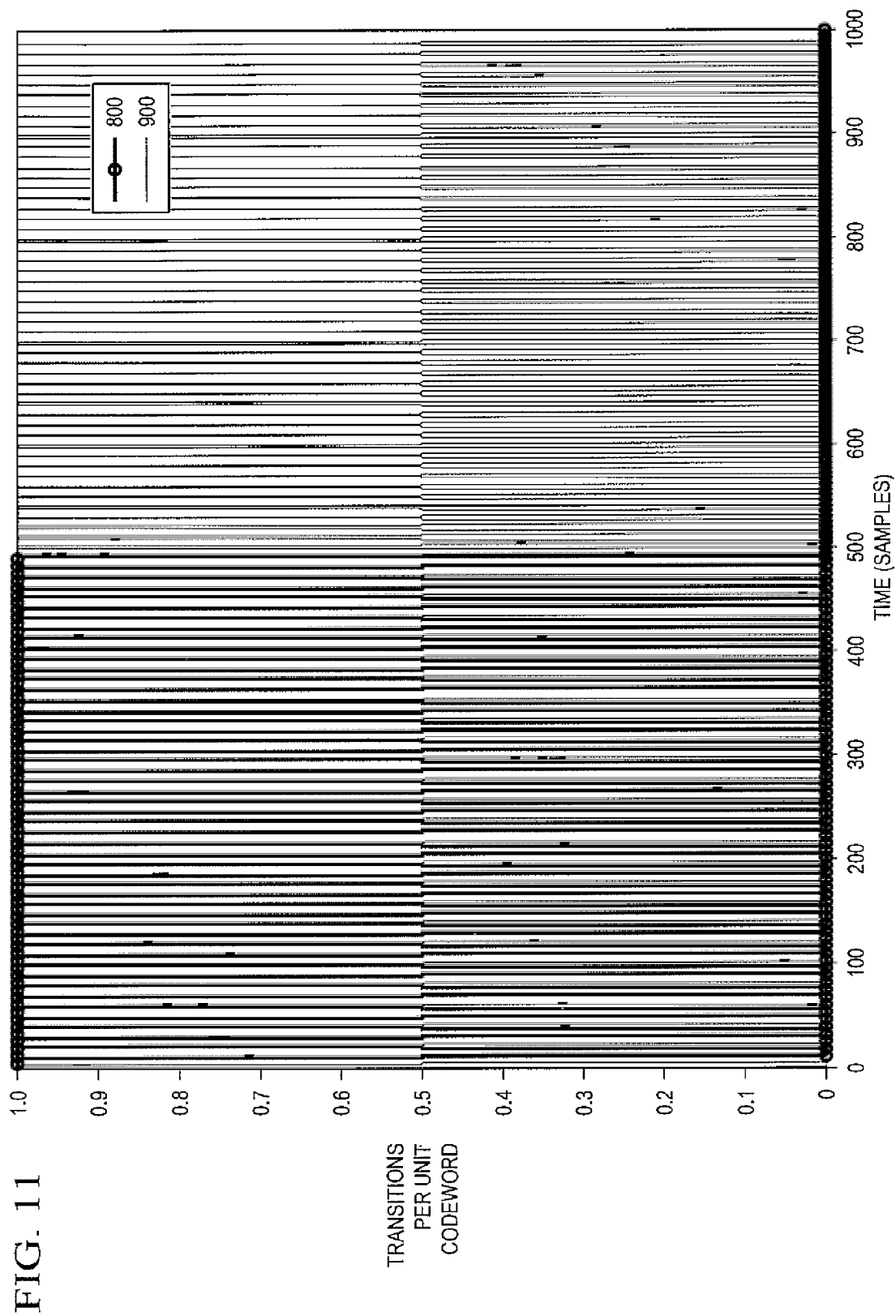
FIG. 11 shows a comparison between the first algorithm using interleaving and the second algorithm without interleaving, according to embodiments of the present disclosure.

FIG. 11 shows a comparison of overall transitions in a 25.3% dimming pattern generated using algorithm 800 plus interleaving versus using algorithm 900 without interleaving, according to embodiments of the present disclosure. As can be seen in FIG. 11, even without interleaving, algorithm 900 is preferable to algorithm 800, since the number of 100% visible frames and 0% visible frames is more balanced across all samples. It is possible to further improve the result of algorithm 800 plus interleaving by matching the interleaver pattern to the ratio of the duty cycles of the 100% and 0% visibility patterns. However, since algorithm 900 uses 20% and 30% visibility patterns to achieve 25.3% visibility, algorithm 900 will still be preferable in most cases to algorithm 800.

Although the preceding examples uses the predefined ECMA TC-47 visibility patterns shown in Table 1, such patterns are for illustration purposes only. It will be understood that other low resolution patterns may be used as well.

Figure 12:
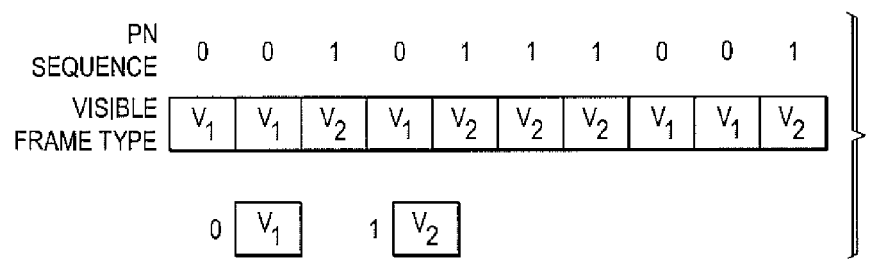
FIG. 12 depicts a method of randomly selecting visibility patterns based on a Pseudo-Noise (PN) sequence, according to an embodiment of the present disclosure.

FIG. 12 depicts a method of randomly selecting visibility patterns based on a Pseudo-Noise (PN) sequence, according to an embodiment of the present disclosure. As shown in FIG. 12, each bit of the PN sequence is examined. A PN sequence bit equal to '0' corresponds to transmission of visible pattern $V_i$ while a PN sequence bit equal to '1' determines transmission of visible pattern $V_2$. In another embodiment, visibility patterns are selected randomly based on an outcome of a random number generator. For example, probabilities $\{P_0, P_1, \ldots, P_K\}$ are allocated for visibility patterns $\{V_0, V_1, \ldots, V_k\}$, respectively. For example, to generate 3% visibility, the following is selected:

$P_0$=0.7, $P_1$=0.3 with $V_0$=0%, $V_1$=10%.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a visible light communication (VLC) network, a method for generating high resolution frames for dimming support, the method comprising:
receiving a required visibility for the high resolution frames;
generating a sequence of patterns in a physical (PHY) layer of a communications device that meets the required visibility, the sequence comprising a first selected quantity of first low resolution frames selected from a set of low resolution frames corresponding to visibility patterns at a first resolution combined with a second selected quantity of second low resolution frames selected from the set, the first low resolution frames comprising a first pattern of a plurality of bits representing a corresponding positive amount of light at a light source and the second low resolution frames comprising a second pattern different than the first pattern of a plurality of bits representing a corresponding positive amount of light at the light source, wherein the first selected quantity of first low resolution frames in combination with the second selected quantity of second low resolution frames satisfies the required visibility; and
transmitting the sequence to achieve the required high resolution frames.

2. The method of claim 1, wherein the first resolution is 10%.

3. The method of claim 1, further comprising:
selecting a pattern for the first low resolution frame, sel1pat, based upon to an equation $$sel1pat = \left\lfloor \frac{dv * K}{100} \right\rfloor;$$

and
selecting a pattern for the second low resolution frame, sel2pat, based upon to an equation $$sel2pat = \left\lceil \frac{dv * K}{100} \right\rceil,$$

wherein dv is a required visibility of the high resolution frames expressed as a percentage value and K is one less than a number of different predetermined low resolution frames.

4. The method of claim 1, wherein the second quantity, reppat2, of the second low resolution frames is determined by:

$$reppat2 = 10^{-p}\left(dv - \frac{100*sel1pat}{K}\right);$$

and the first quantity, reppat1, of the first low resolution frames is determined by:

reppat1=$10^{-p}$–reppat2, where p is a desired precision expressed as an integer logarithm value, dv is the required visibility of the high resolution frames expressed as a percentage value, and K is one less than a number of different predetermined low resolution frames.

5. The method of claim 1, wherein the sequence includes the first quantity of the first low resolution frames interleaved with the second quantity of the second low resolution frames.

6. The method of claim 1, wherein the set of low resolution frames range from 0% visibility to 100% visibility in increments of 10%.

7. The method of claim 1, wherein the high resolution frames are generated for at least one of visibility and data communication.

8. The method of claim 1, wherein the high resolution frames are generated in one of:
   a physical layer (PHY) within a packet; and
   a medium access control layer (MAC) across one or more packets.

9. For use in a visible light communication (VLC) network, a transmitter capable of generating and transmitting high resolution frames for dimming support, the transmitter comprising:
   a controller configured to:
      receive a required visibility for the high resolution frames, and
      generate a sequence of patterns in a physical (PHY) layer of a communications device containing the controller that meets the required visibility, the sequence comprising a first quantity of first low resolution frames selected from a set of low resolution frames corresponding to visibility patterns at a first resolution combined with a second quantity of second low resolution frames selected from the set, the first low resolution frames comprising a first pattern of a plurality of bits representing a corresponding positive amount of light at a light source and the second low resolution frames comprising a second pattern different than the first pattern of a plurality of bits representing a corresponding positive amount of light at the light source, wherein the first quantity of first low resolution frames in combination with the second quantity of second low resolution frames satisfies the required visibility; and
   a light source configured to transmit the sequence to achieve the required high resolution frames.

10. The transmitter of claim 9, wherein the first resolution is 10%.

11. The transmitter of claim 9, wherein the controller is further configured to:
   select a pattern for the first low resolution visibility frame, sel1pat, upon to an equation $$sel1pat = \left\lfloor \frac{dv*K}{100} \right\rfloor;$$

and selecting a pattern for the second low resolution frame, sel2pat, based upon an equation $$sel2pat = \left\lceil \frac{dv*K}{100} \right\rceil,$$

wherein dv is the required visibility of the high resolution frames expressed as a percentage value and K is one less than a number of different predetermined low resolution frames.

12. The transmitter of claim 9, wherein:
the second quantity, reppat2, of the second low resolution frames is determined by:

$$reppat2 = 10^{-p}\left(dv - \frac{100*sel1pat}{K}\right);$$

and the first quantity, reppat1, of the first low resolution frames is determined by:

reppat1=$10^{-p}$–reppat2, where p is a desired precision expressed as an integer logarithm value, dv is the required visibility of the high resolution frames expressed as a percentage value, and K is one less than a number of different predetermined low resolution frames.

13. The transmitter of claim 9, wherein the sequence includes the first quantity of the first low resolution frames interleaved with the second quantity of the second low resolution frames.

14. The transmitter of claim 9, wherein the set of predetermined low resolution frames range from 0% visibility to 100% visibility in increments of 10%.

15. The transmitter of claim 9, wherein the high resolution frames are generated for at least one of visibility and data communication.

16. The transmitter of claim 9, wherein the high resolution frames are generated in one:
   a physical layer (PHY) within a packet; and
   a medium access control layer (MAC) across one or more packets.

17. For use in visible light communication (VLC), a system for generating high resolution frames for dimming support, the system comprising:
   a transmitter, the transmitter configured to:
      receive a required visibility for the high resolution frames,
      generate a sequence of patterns in a physical (PHY) layer of a communications device including the transmitter that meets the required visibility, the sequence comprising a first quantity of first low resolution frames selected from a set of low resolution frames corresponding to visibility patterns at a first resolution combined with a second quantity of second low resolution frames selected from the set, the first low resolution frames comprising a first pattern of a plurality of bits representing a corresponding positive amount of light at a light source and the second low resolution frames comprising a second pattern different than the first pattern of a plurality of bits representing a corresponding positive amount of light at the light source, wherein the first quantity of first low resolution frames in combination with the second quantity of second low resolution frames satisfies the required visibility, and transmit the sequence to achieve the required high resolution frames; and a receiver configured to receive data at the required visibility by adapting the data reception according to the sequence generated at the transmitter.

18. The system of claim 17, wherein the first resolution is 10%.

19. The system of claim 17, wherein the transmitter is further configured to:

select a pattern for the first low resolution visibility frame, sel1pat, upon an equation $$sel1pat = \left\lfloor \frac{dv * K}{100} \right\rfloor;$$

and selecting a pattern for the second low resolution frame, sel2pat, based upon an equation $$sel2pat = \left\lceil \frac{dv * K}{100} \right\rceil,$$

wherein dv is the required visibility of the high resolution frames expressed as a percentage value and K is one less than a number of different predetermined low resolution frames.

20. The system of claim 17, wherein:

the second quantity, reppat2, of the second low resolution frames is determined by:

$$reppat2 = 10^{-p}\left(dv - \frac{100 * sel1pat}{K}\right),$$

and the first quantity, reppat1, of the first low resolution frames is determined by:

reppat1=10$^{-p}$−reppat2, where p is a desired precision expressed as an integer logarithm value, dv is the required visibility of the high resolution frames expressed as a percentage value, and K is one less than a number of different predetermined low resolution frames.

* * * * *